(12) United States Patent
Van De Ven et al.

(10) Patent No.: US 10,379,277 B2
(45) Date of Patent: Aug. 13, 2019

(54) LIGHTING DEVICE (75) Inventors: Antony Paul Van De Ven, Hong Kong (CN); Gerald H. Negley, Durham, NC (US)

(73) Assignee: IDEAL Industries Lighting LLC, Sycamore, IL (US)

( * ) Notice: Subject to any disclaimer, the term of this patent is extended or adjusted under 35 U.S.C. 154(b) by 1113 days.

(21) Appl. No.: 11/854,750

(22) Filed: Sep. 13, 2007

(65) Prior Publication Data

US 2009/0021139 A1    Jan. 22, 2009

Related U.S. Application Data (60) Provisional application No. 60/844,305, filed on Sep. 13, 2006.

(51) Int. Cl.
*H01L 33/00* (2010.01)
*F21V 8/00* (2006.01)
*F21K 9/61* (2016.01)
*F21Y 115/10* (2016.01)

(52) U.S. Cl.
CPC ............... *G02B 6/001* (2013.01); *F21K 9/61* (2016.08); *F21Y 2115/10* (2016.08)

(58) Field of Classification Search
CPC ...................................................... F21K 9/58
USPC ........................................................ 362/610
See application file for complete search history.

(56) References Cited

U.S. PATENT DOCUMENTS

| | | | | |
|---|---|---|---|---|
| 4,616,257 A | * | 10/1986 | Kloots et al. | 348/370 |
| 4,677,473 A | * | 6/1987 | Okamoto et al. | 348/126 |
| 4,884,112 A | * | 11/1989 | Lorenzo et al. | 257/86 |
| 5,315,673 A | * | 5/1994 | Stetter et al. | 385/12 |
| 5,907,395 A | * | 5/1999 | Schulz et al. | 356/139.03 |
| 6,072,280 A | | 6/2000 | Allen | |
| 6,224,216 B1 | * | 5/2001 | Parker et al. | 353/31 |
| 6,234,645 B1 | | 5/2001 | Börner et al. | |

(Continued)

FOREIGN PATENT DOCUMENTS

| | | |
|---|---|---|
| CN | 2472056 Y | 1/2002 |
| CN | 1711442 A | 12/2005 |

(Continued)

OTHER PUBLICATIONS

U.S. Appl. No. 11/614,180, filed Dec. 21, 2006.

(Continued)

*Primary Examiner* — Joseph L Williams
*Assistant Examiner* — Jacob R Stern
(74) *Attorney, Agent, or Firm* — Burr & Brown, PLLC (57) ABSTRACT

Lighting devices comprising first and second solid state light emitters and an optical device (e.g., optical fiber). If the emitters are illuminated, (1) light from at least one of the emitters travels through at least a portion of the optical device, and light from the first emitter is mixed with light from the second emitter, and/or (2) light from at least one of the emitters travels through at least a portion of the optical device, and white light is emitted from the lighting device. Also, a lighting device comprising at least one LED, at least one lumiphor, and an optical device, in which if each of the LED(s) is illuminated and each of the lumiphor(s) is excited, at least some of the light emitted from the LED(s) or emitted from the lumiphor(s) travels through at least a first portion of the optical device.

15 Claims, 2 Drawing Sheets

(56) References Cited

U.S. PATENT DOCUMENTS

| | | | |
|---|---|---|---|
| 6,461,019 B1 | 10/2002 | Allen | |
| 6,495,964 B1 | 12/2002 | Muthu et al. | |
| 6,513,962 B1* | 2/2003 | Mayshack | F21V 3/04 362/33 |
| 6,600,175 B1 | 7/2003 | Baretz et al. | |
| 6,688,747 B2 | 2/2004 | Wichner et al. | |
| 7,090,386 B2 | 8/2006 | Coushaine et al. | |
| 7,168,862 B2 | 1/2007 | Qi et al. | |
| 7,213,940 B1 | 5/2007 | Van De Ven et al. | |
| 2003/0147254 A1* | 8/2003 | Yoneda et al. | 362/551 |
| 2004/0264193 A1 | 12/2004 | Okumura | |
| 2005/0052883 A1 | 3/2005 | Qi et al. | |
| 2005/0281025 A1 | 12/2005 | Coushaine et al. | |
| 2006/0087840 A1 | 4/2006 | Franklin et al. | |
| 2006/0105482 A1 | 5/2006 | Alferink et al. | |
| 2006/0285316 A1* | 12/2006 | Tufenkjian et al. | 362/105 |
| 2007/0247414 A1 | 10/2007 | Roberts | |

FOREIGN PATENT DOCUMENTS

| | | |
|---|---|---|
| DE | 101 39 578 | 4/2003 |
| EP | 1 462 711 | 9/2004 |
| EP | 1 614 957 | 1/2006 |
| EP | 1 614 957 A2 | 1/2006 |
| JP | 2001-118411 | 4/2001 |
| TW | 337202 | 7/1998 |
| TW | M267636 | 6/2005 |
| TW | M286902 U | 2/2006 |
| WO | 00/19141 | 4/2000 |
| WO | 03/081125 A1 | 10/2003 |
| WO | WO 03/081125 | 10/2003 |
| WO | 2006/007388 | 1/2006 |
| WO | 2006/033029 | 3/2006 |
| WO | 2006/033031 | 3/2006 |

OTHER PUBLICATIONS

U.S. Appl. No. 11/613,714, filed Dec. 20, 2006.
U.S. Appl. No. 11/613,733, filed Dec. 20, 2006.
U.S. Appl. No. 11/624,811, filed Jan. 19, 2007.
U.S. Appl. No. 11/751,982, filed May 22, 2007.
U.S. Appl. No. 11/753,103, filed May 24, 2007.
U.S. Appl. No. 11/751,990, filed May 22, 2007.
U.S. Appl. No. 11/736,761, filed Apr. 18, 2007.
U.S. Appl. No. 11/736,799, filed Apr. 18, 2007.
U.S. Appl. No. 11/737,321, filed Apr. 19, 2007.
U.S. Appl. No. 11/936,163, filed Nov. 7, 2007.
U.S. Appl. No. 11/843,243, filed Aug. 22, 2007.
U.S. Appl. No. 11/948,021, filed Nov. 30, 2007.
U.S. Appl. No. 11/870,679, filed Oct. 11, 2007.
Taiwan Office Action dated Jan. 30, 2013 (and translation provided by foreign counsel) from a corresponding Taiwan patent application.
Taiwan Office Action dated Oct. 15, 2013 (and translation provided by foreign counsel) from a corresponding Taiwan patent application.
Taiwan Office Action (and translation provided by foreign counsel) from a corresponding Taiwan patent application bearing a mailing date of Feb. 18, 2016, 22 pages.
Taiwan Office Action (and translation provided by foreign counsel) from a corresponding Taiwan patent application bearing a mailing date of Dec. 19, 2016, 18 pages.

* cited by examiner

LIGHTING DEVICE

CROSS-REFERENCE TO RELATED APPLICATIONS

This application claims the benefit of U.S. Provisional Patent Application No. 60/844,305, filed Sep. 13, 2006, the entirety of which is incorporated herein by reference.

FIELD OF THE INVENTION

The present invention relates to lighting devices which include solid state light emitters. In some aspects, the present invention relates to lighting devices which include LEDs and/or lumiphors.

BACKGROUND OF THE INVENTION

A large proportion (some estimates are as high as twenty-five percent) of the electricity generated in the United States each year goes to lighting. Accordingly, there is an ongoing need to provide lighting which is more energy-efficient. It is well-known that incandescent light bulbs are very energy-inefficient light sources—about ninety percent of the electricity they consume is released as heat rather than light. Fluorescent light bulbs are more efficient than incandescent light bulbs (by a factor of about 10) but are still less efficient than solid state light emitters, such as light emitting diodes.

In addition, as compared to the normal lifetimes of solid state light emitters, e.g., light emitting diodes, incandescent light bulbs have relatively short lifetimes, i.e., typically about 750-1000 hours. In comparison, light emitting diodes, for example, have typical lifetimes between 50,000 and 70,000 hours. Fluorescent bulbs have longer lifetimes (e.g., 10,000-20,000 hours) than incandescent lights, but provide less favorable color reproduction.

As a result, another issue faced by conventional light fixtures is the need to periodically replace the lighting devices (e.g., light bulbs, etc.). Such issues are particularly pronounced where access is difficult (e.g., vaulted ceilings, bridges, high buildings, traffic tunnels) and/or where change-out costs are extremely high. The typical lifetime of conventional fixtures is about 20 years, corresponding to a light-producing device usage of at least about 44,000 hours (based on usage of 6 hours per day for 20 years). Light-producing device lifetime is typically much shorter, thus creating the need for periodic change-outs.

Accordingly, for these and other reasons, efforts have been ongoing to develop ways by which solid state light emitters can be used in place of incandescent lights, fluorescent lights and other light-generating devices in a wide variety of applications. In addition, where light emitting diodes (or other solid state light emitters) are already being used, efforts are ongoing to provide light emitting diodes (or other solid state light emitters) which are improved, e.g., with respect to energy efficiency, color rendering index (CRI Ra), contrast, efficacy (lm/W), low cost and/or duration of service.

A variety of solid state light emitters are well-known.

For example, one type of solid state light emitter is a light emitting diode.

Light emitting diodes are semiconductor devices that convert electrical current into light. A wide variety of light emitting diodes are used in increasingly diverse fields for an ever-expanding range of purposes.

More specifically, light emitting diodes are semiconducting devices that emit light (ultraviolet, visible, or infrared) when a potential difference is applied across a p-n junction structure. There are a number of well-known ways to make light emitting diodes and many associated structures, and the present invention can employ any such devices. By way of example, Chapters 12-14 of Sze, Physics of Semiconductor Devices, (2d Ed. 1981) and Chapter 7 of Sze, Modern Semiconductor Device Physics (1998) describe a variety of photonic devices, including light emitting diodes.

The expression "light emitting diode" is used herein to refer to the basic semiconductor diode structure (i.e., the chip). The commonly recognized and commercially available "LED" that is sold (for example) in electronics stores typically represents a "packaged" device made up of a number of parts. These packaged devices typically include a semiconductor based light emitting diode such as (but not limited to) those described in U.S. Pat. Nos. 4,918,487; 5,631,190; and 5,912,477; various wire connections, and a package that encapsulates the light emitting diode.

As is well-known, a light emitting diode produces light by exciting electrons across the band gap between a conduction band and a valence band of a semiconductor active (light-emitting) layer. The electron transition generates light at a wavelength that depends on the band gap. Thus, the color of the light (wavelength) emitted by a light emitting diode depends on the semiconductor materials of the active layers of the light emitting diode.

In substituting light emitting diodes for other light sources, e.g., incandescent light bulbs, packaged LEDs have been used with conventional light fixtures, for example, fixtures which include a hollow lens and a base plate attached to the lens, the base plate having a conventional socket housing with one or more contacts which is electrically coupled to a power source. For example, LED light bulbs have been constructed which comprise an electrical circuit board, a plurality of packaged LEDs mounted on the circuit board, and a connection post attached to the circuit board and adapted to be connected to the socket housing of the light fixture, whereby the plurality of LEDs can be illuminated by the power source.

Although the development of light emitting diodes has in many ways revolutionized the lighting industry, some of the characteristics of light emitting diodes have presented challenges, some of which have not yet been fully met.

There is an ongoing need for ways to use solid state light emitters, e.g., light emitting diodes, in a wider variety of applications, with greater energy efficiency, with improved color rendering index (CRI Ra), with improved efficacy (lm/W), low cost and/or with longer duration of service.

BRIEF SUMMARY OF THE INVENTION

In accordance with a first aspect of the present invention, there is provided a lighting device, comprising:
at least first and second solid state light emitters; and
at least a first optical device,
wherein:
if both of the first and second solid state light emitters are illuminated, at least a portion of light from at least one of the first solid state light emitter and second solid state light emitter travels through at least a portion of the first optical device,
if both of the first and second solid state light emitters are illuminated, at least some of the light emitted from the first solid state light emitter is mixed with at least some of the light emitted from the second solid state light emitter, to produce mixed light.

In some embodiments according to this aspect of the present invention, the first optical device comprises at least a first lossy region, and the mixed light exits from the first optical device at the first lossy region.

In some embodiments according to this aspect of the present invention:

the light emitted from the first solid state light emitter passes through at least a first portion of the first optical device prior to mixing with the light from the second solid state light emitter, and the light emitted from the second solid state light emitter passes through at least a second portion of the first optical device prior to mixing with the light from the first solid state light emitter.

In some embodiments according to this aspect of the present invention:

the light emitted from the first solid state light emitter passes through at least a first portion of the first optical device before mixing with the light emitted from the second solid state light emitter; and the light emitted from the second solid state light emitter does not pass through any portion of any optical device before mixing with the light emitted from the first solid state light emitter.

In some embodiments according to this aspect of the present invention:

the light emitted from the first solid state light emitter passes through at least a first portion of the first optical device before mixing with the light emitted from the second solid state light emitter; and the light emitted from the second solid state light emitter passes through at least a first portion of a second optical device before mixing with the light emitted from the first solid state light emitter.

In some embodiments according to this aspect of the present invention, if the first optical device were not included, at least a portion of the light emitted from the first solid state light emitter would not mix with the light emitted from the second solid state light emitter.

In some embodiments according to this aspect of the present invention, if the first optical device were not included, none of the light emitted from the first solid state light emitter would mix with the light emitted from the second solid state light emitter.

In some embodiments according to this aspect of the present invention, if the first solid state light emitter is illuminated, light emitted from the first solid state light emitter has x, y color coordinates which define a point which is within an area on a 1931 CIE Chromaticity Diagram enclosed by first, second, third, fourth and fifth line segments, the first line segment connecting a first point to a second point, the second line segment connecting the second point to a third point, the third line segment connecting the third point to a fourth point, the fourth line segment connecting the fourth point to a fifth point, and the fifth line segment connecting the fifth point to the first point, the first point having x, y coordinates of 0.32, 0.40, the second point having x, y coordinates of 0.36, 0.48, the third point having x, y coordinates of 0.43, 0.45, the fourth point having x, y coordinates of 0.42, 0.42, and the fifth point having x, y coordinates of 0.36, 0.38.

In accordance with a second aspect of the present invention, there is provided a lighting device, comprising:

at least first and second solid state light emitters; and at least a first optical device, wherein:

if both of the first and second solid state light emitters are illuminated, at least a portion of light from at least one of the first solid state light emitter and second solid state light emitter travels through at least a portion of the first optical device, if both of the first and second solid state light emitters are illuminated, white light is emitted from the lighting device, the white light comprising light emitted from the first solid state light emitter and light emitted from the second solid state light emitter.

In some embodiments according to this aspect of the present invention, if the first optical device were not included, at least a portion of the light emitted from the first solid state light emitter would not mix with the light emitted from the second solid state light emitter.

In some embodiments according to this aspect of the present invention, if the first optical device were not included, none of the light emitted from the first solid state light emitter would mix with the light emitted from the second solid state light emitter.

In accordance with a third aspect of the present invention, there is provided a lighting device comprising:

a first group of LEDs, the first group of LEDs comprising at least a first LED;

a first group of lumiphors, the first group of lumiphors comprising at least a first lumiphor;

a second group of LEDs, the second group of LEDs comprising at least a second LED; and at least a first optical device, wherein:

each of the first group of light emitting diodes, if illuminated, emits light having a peak wavelength in a range of from 430 nm to 480 nm;

each of the first group of lumiphors, if excited, emits light having a dominant wavelength in a range of from about 555 nm to about 585 nm;

each of the second group of light emitting diodes, if illuminated, emits light having a dominant wavelength in a range of from 600 nm to 630 $\mu$m; and if each of the first group of LEDs and each of the second group of LEDs is illuminated, and each of the first group of lumiphors is excited, at least some light from among light emitted from the first group of LEDs, light emitted from the first group of lumiphors and light emitted from the second group of LEDs travels through at least a first portion of the first optical device.

In some embodiments according to this aspect of the present invention, the first group of light emitting diodes consists of all of the 430 nm to 480 nm light emitting diodes in the device, the first group of lumiphors consists of all of the 555 nm to 585 nm lumiphors in the device, and the second group of light emitting diodes consists of all of the 600 nm to 630 nm light emitting diodes in the device.

In some embodiments according to this aspect of the present invention, if all of the light emitting diodes in the first group of light emitting diodes are illuminated, all of the lumiphors in the first group of lumiphors are excited by light emitted from the light emitting diodes.

In some embodiments according to this aspect of the present invention, each of the light emitting diodes in the first group of light emitting diodes is embedded within an encapsulant element in which one of the first group of lumiphors is also embedded.

In accordance with a fourth aspect of the present invention, there is provided a lighting device comprising:

a first group of LEDs, the first group of LEDs comprising at least a first LED;

a first group of lumiphors, the first group of lumiphors comprising at least a first lumiphor;

at least a first optical device, wherein:

each of the first group of light emitting diodes, if illuminated, emits light having a peak wavelength in a range of from 430 nm to 480 nm;

each of the first group of lumiphors, if excited, emits light having a dominant wavelength in a range of from about 555 nm to about 585 nm; and if each of the first group of LEDs is illuminated and each of the first group of lumiphors is excited, at least some light from among light emitted from the first group of LEDs and the light emitted from the first group of lumiphors travels through at least a first portion of the first optical device.

In some embodiments according to this aspect of the present invention, the first group of light emitting diodes consists of all of the 430 nm to 480 nm light emitting diodes in the device, and the first group of lumiphors consists of all of the 555 nm to 585 μm lumiphors in the device.

In some embodiments according to this aspect of the present invention, if all of the light emitting diodes in the first group of light emitting diodes are illuminated, all of the lumiphors in the first group of lumiphors are excited by light emitted from the light emitting diodes.

In some embodiments according to this aspect of the present invention, each of the light emitting diodes in the first group of light emitting diodes is embedded within an encapsulant element in which one of the first group of lumiphors is also embedded.

In accordance with a fifth aspect of the present invention, there is provided a lighting device comprising:

a first group of LEDs, the first group of LEDs comprising at least a first LED;

a first group of lumiphors, the first group of lumiphors comprising at least a first lumiphor;

at least a first optical device, wherein:

if each of the first group of LEDs is illuminated and each of the first group of lumiphors is excited, a mixture of light emitted from the first group of light emitting diodes and the first group of lumiphors has, in the absence of any additional light, a first group mixed illumination having x, y color coordinates which define a point which is within an area on a 1931 CIE Chromaticity Diagram enclosed by first, second, third, fourth and fifth line segments, the first line segment connecting a first point to a second point, the second line segment connecting the second point to a third point, the third line segment connecting the third point to a fourth point, the fourth line segment connecting the fourth point to a fifth point, and the fifth line segment connecting the fifth point to the first point, the first point having x, y coordinates of 0.32, 0.40, the second point having x, y coordinates of 0.36, 0.48, the third point having x, y coordinates of 0.43, 0.45, the fourth point having x, y coordinates of 0.42, 0.42, and the fifth point having x, y coordinates of 0.36, 0.38.

In some embodiments according to this aspect of the present invention, if all of the light emitting diodes in the first group of light emitting diodes are illuminated, all of the lumiphors in the first group of lumiphors are excited by light emitted from the light emitting diodes.

In some embodiments according to this aspect of the present invention, each of the light emitting diodes in the first group of light emitting diodes is embedded within an encapsulant element in which one of the first group of lumiphors is also embedded.

In accordance with a sixth aspect of the present invention, there is provided a lighting device comprising:

a first group of LEDs, the first group of LEDs comprising at least a first LED;

a first group of lumiphors, the first group of lumiphors comprising at least a first lumiphor; and at least a first optical device, wherein:

if each of the first group of LEDs is illuminated and each of the first group of lumiphors is excited, at least some light from among the light emitted from the first group of LEDs and the light emitted from the first group of lumiphors travels through at least a first portion of the first optical device.

In some embodiments according to this aspect of the present invention, if all of the light emitting diodes in the first group of light emitting diodes are illuminated, all of the lumiphors in the first group of lumiphors are excited by light emitted from the light emitting diodes.

In some embodiments according to this aspect of the present invention, each of the light emitting diodes in the first group of light emitting diodes is embedded within an encapsulant element in which one of the first group of lumiphors is also embedded.

The invention may be more fully understood with reference to the accompanying drawings and the following detailed description of the invention.

DETAILED DESCRIPTION OF THE INVENTION

The present invention now will be described more fully hereinafter with reference to the accompanying drawings, in which embodiments of the invention are shown. However, this invention should not be construed as limited to the embodiments set forth herein. Rather, these embodiments are provided so that this disclosure will be thorough and complete, and will fully convey the scope of the invention to those skilled in the art. Like numbers refer to like elements throughout. As used herein the term "and/or" includes any and all combinations of one or more of the associated listed items.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

When an element is referred to herein as being "on" or extending "onto" another element, it can be directly on or extend directly onto the other element or intervening elements may also be present. In contrast, when an element is referred to herein as being "directly on" or extending "directly onto" another element, there are no intervening elements present. Also, when an element is referred to herein as being "connected" or "coupled" to another element, it can be directly connected or coupled to the other element or intervening elements may be present. In contrast, when an element is referred to herein as being "directly connected" or "directly coupled" to another element, there are no intervening elements present.

Although the terms "first", "second", etc. may be used herein to describe various elements, components, regions, layers, sections and/or parameters, these elements, components, regions, layers, sections and/or parameters should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Furthermore, relative terms, such as "lower" or "bottom" and "upper" or "top," may be used herein to describe one element's relationship to another elements as illustrated in the Figures. Such relative terms are intended to encompass different orientations of the device in addition to the orientation depicted in the Figures. For example, if the device in the Figures is turned over, elements described as being on the "lower" side of other elements would then be oriented on "upper" sides of the other elements. The exemplary term "lower", can therefore, encompass both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

Embodiments in accordance with the present invention are described herein with reference to schematic illustrations of idealized embodiments of the present invention. As such, variations from the shapes of the illustrations as a result, for example, of manufacturing techniques and/or tolerances, are to be expected. Thus, embodiments of the present invention should not be construed as limited to the particular shapes of regions illustrated herein but are to include deviations in shapes that result, for example, from manufacturing. For example, a molded region illustrated or described as a rectangle will, typically, have rounded or curved features. Thus, the regions illustrated in the figures are schematic in nature and their shapes are not intended to illustrate the precise shape of a region of a device and are not intended to limit the scope of the present invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein. It will also be appreciated by those of skill in the art that references to a structure or feature that is disposed "adjacent" another feature may have portions that overlap or underlie the adjacent feature.

The expression "illumination" (or "illuminated"), as used herein when referring to a solid state light emitter, means that at least some current is being supplied to the solid state light emitter to cause the solid state light emitter to emit at least some light. The expression "illuminated" encompasses situations where the solid state light emitter emits light continuously or intermittently at a rate such that a human eye would perceive it as emitting light continuously, or where a plurality of solid state light emitters of the same color or different colors are emitting light intermittently and/or alternatingly (with or without overlap in "on" times) in such a way that a human eye would perceive them as emitting light continuously (and, in cases where different colors are emitted, as a mixture of those colors).

The expression "excited", as used herein when referring to a lumiphor, means that at least some electromagnetic radiation (e.g., visible light, UV light or infrared light) is contacting the lumiphor, causing the lumiphor to emit at least some light. The expression "excited" encompasses situations where the lumiphor emits light continuously or intermittently at a rate such that a human eye would perceive it as emitting light continuously, or where a plurality of lumiphors of the same color or different colors are emitting light intermittently and/or alternatingly (with or without overlap in "on" times) in such a way that a human eye would perceive them as emitting light continuously (and, in cases where different colors are emitted, as a mixture of those colors).

As noted above, in accordance with the first aspect of the present invention, there is provided a lighting device, comprising:

at least first and second solid state light emitters; and
at least a first optical device,
wherein:
if both of the first and second solid state light emitters are illuminated, at least a portion of light from at least one of the first solid state light emitter and second solid state light emitter travels through at least a portion of the first optical device,
if both of the first and second solid state light emitters are illuminated, at least some of the light emitted from the first solid state light emitter is mixed with at least some of the light emitted from the second solid state light emitter, to produce mixed light.

Figure 1:
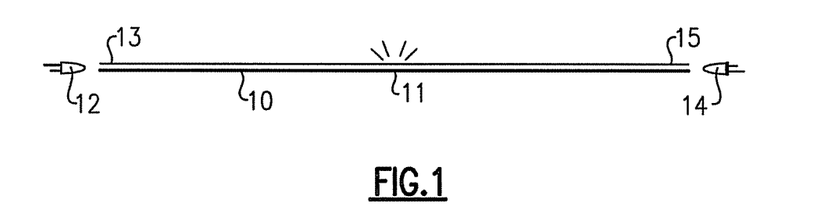
FIG. 1 depicts a first representative embodiment according to this aspect of the present invention.

FIG. 1 depicts a first representative embodiment according to this aspect of the present invention. The first embodiment comprises an optical device 10 which comprises at least a lossy region 11. Light from a first solid state light emitter 12 is fed to a first end 13 of the optical device 10, light from a second solid state light emitter 14 is fed to a second end 15 of the optical device 10, light from the first and second solid state light emitters travel through respective portions of the optical device 10 and then mix and exit from the optical device 10 at the lossy region 11. In this embodiment, the light emitted from the first solid state light emitter 12 passes through at least a first portion of the optical device 10 prior to mixing with the light from the second solid state light emitter 14, and the light emitted from the second solid state light emitter 14 passes through at least a second portion of the optical device 10 prior to mixing with the light from the first solid state light emitter 12.

Figure 2:
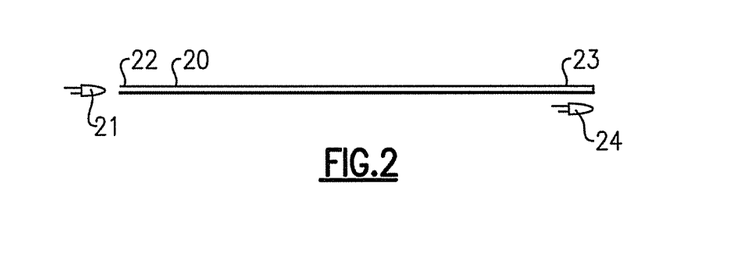
FIG. 2 depicts a second representative embodiment according to this aspect of the invention.

FIG. 2 depicts a second representative embodiment according to this aspect of the invention. The second embodiment comprises an optical device 20. Light from a first solid state light emitter 21 is fed to a first end 22 of the optical device 20, travels through the optical device 20, exits from a second end 23 of the optical device 20, and then mixes with light from a second solid state light emitter 24. In this embodiment, the light emitted from the first solid state light emitter 21 passes through at least a first portion of the optical device 20 before mixing with the light emitted from the second solid state light emitter 24, and the light emitted from the second solid state light emitter 24 does not pass through any portion of any optical device before mixing with the light emitted from the first solid state light emitter 21.

Figure 3:
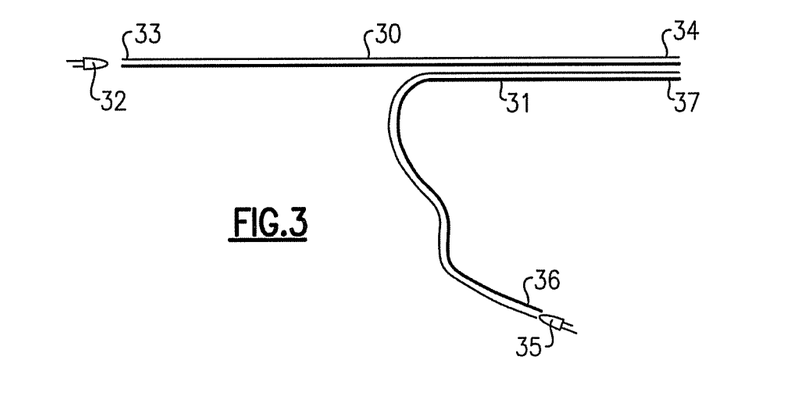
FIG. 3 depicts a third representative embodiment according to this aspect of the invention.

FIG. 3 depicts a third representative embodiment according to this aspect of the invention. The third embodiment comprises a first optical device 30 and a second optical device 31. Light from a first solid state light emitter 32 is fed to a first end 33 of the first optical device 30, travels through the first optical device 30, and exits from a second end 34 of the first optical device 30. Light from a second solid state light emitter 35 is fed to a first end 36 of the second optical device 31, travels through the first optical device 31, and exits from a second end 37 of the first optical device 31. The light from the first solid state light emitter 32 and the light from the second solid state light emitter 35 mix after exiting from the first optical device 30 and the second optical device 31, respectively. In this embodiment, the light emitted from the first solid state light emitter 32 passes through at least a first portion of the first optical device 30 before mixing with the light emitted from the second solid state light emitter 35, and the light emitted from the second solid state light emitter 35 passes through at least a first portion of a second optical device 31 before mixing with the light emitted from the first solid state light emitter 32.

As noted above, in accordance with the second aspect of the present invention, there is provided a lighting device, comprising:

at least first and second solid state light emitters; and
at least a first optical device,
wherein:
if both of the first and second solid state light emitters are illuminated, at least a portion of light from at least one of the first solid state light emitter and second solid state light emitter travels through at least a portion of the first optical device,
if both of the first and second solid state light emitters are illuminated, white light is emitted from the lighting device, the white light comprising light emitted from the first solid state light emitter and light emitted from the second solid state light emitter.

In this aspect of the present invention, the colorings of the respective solid state light emitters are selected such that the mixed light will be white. Any combination of colorings which, when mixed, produce white light. Representative examples of such combinations of colorings are described in:

(1) U.S. Patent Application No. 60/752,555, filed Dec. 21, 2005, entitled "Lighting Device and Lighting Method" (inventors: Antony Paul Van de Ven and Gerald H. Negley), the entirety of which is hereby incorporated by reference, and U.S. patent application Ser. No. 11/613,714, filed Dec. 20, 2006;

(2) U.S. Patent Application No. 60/793,524, filed on Apr. 20, 2006, entitled "LIGHTING DEVICE AND LIGHTING METHOD" (inventors: Gerald H. Negley and Antony Paul van de Ven), the entirety of which is hereby incorporated by reference, and U.S. patent application Ser. No. 11/736,761, filed Apr. 18, 2007;

(3) U.S. Patent Application No. 60/793,518, filed on Apr. 20, 2006, entitled "LIGHTING DEVICE AND LIGHTING METHOD" (inventors: Gerald H. Negley and Antony Paul van de Ven), the entirety of which is hereby incorporated by reference, and U.S. patent application Ser. No. 11/736,799, filed Apr. 18, 2007;

(4) U.S. Patent Application No. 60/793,530, filed on Apr. 20, 2006, entitled "LIGHTING DEVICE AND LIGHTING METHOD" (inventors: Gerald H. Negley and Antony Paul van de Ven), the entirety of which is hereby incorporated by reference, and U.S. patent application Ser. No. 11/737,321, filed Apr. 19, 2007; and (5) U.S. Pat. No. 7,213,940, issued on May 8, 2007, entitled "LIGHTING DEVICE AND LIGHTING METHOD" (inventors: Antony Paul van de Ven and Gerald H. Negley), the entirety of which is hereby incorporated by reference.

As noted above, in accordance with the third aspect of the present invention, there is provided a lighting device comprising:

a first group of LEDs, the first group of LEDs comprising at least a first LED;
a first group of lumiphors, the first group of lumiphors comprising at least a first lumiphor;
a second group of LEDs, the second group of LEDs comprising at least a second LED; and
at least a first optical device,
wherein:
each of the first group of light emitting diodes, if illuminated, emits light having a peak wavelength in a range of from 430 µm to 480 nm;
each of the first group of lumiphors, if excited, emits light having a dominant wavelength in a range of from about 555 nm to about 585 nm;
each of the second group of light emitting diodes, if illuminated, emits light having a dominant wavelength in a range of from 600 nm to 630 nm; and
if each of the first group of LEDs and each of the second group of LEDs is illuminated, and each of the first group of lumiphors is excited, at least some light from among light emitted from the first group of LEDs, light emitted from the first group of lumiphors and light emitted from the second group of LEDs travels through at least a first portion of the first optical device.

Figure 4:
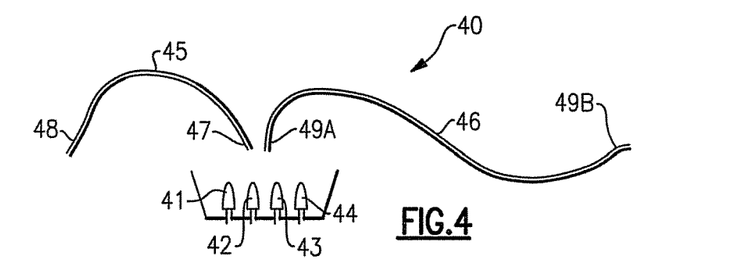
FIG. 4 depicts a first representative embodiment according to the third aspect of the present invention.

FIG. 4 depicts a first representative embodiment according to the third aspect of the present invention. Referring to FIG. 4, there is provided a lighting device 40 including a first solid state light emitter 41, a second solid state light emitter 42, a third solid state light emitter 43, a fourth solid state light emitter 44, a first optical device 45 and a second optical device 46. The first solid state light emitter 41 and the third solid state light emitter 43 each include a light emitting diode which, if illuminated, emits light having a peak wavelength in the range of from 430 nm to 480 µm and a lumiphor which, if excited (which occurs when the light emitting diode is illuminated), emits light having a dominant wavelength in the range of from about 555 nm to about 585 nm. The second solid state light emitter 42 and the fourth solid state light emitter 44 are each light emitting diodes which, if illuminated, emit light having a dominant wavelength in a range of from 600 µm to 630 µm. When the light emitting diodes of the second solid state light emitter 42 and the fourth solid state light emitter 44, and the light emitting diodes included in the first solid state light emitter 41 and the third solid state light emitter 43, are illuminated, the light emitted from the solid state light emitters 41-44 is mixed, and at least a first portion of the mixed light enters a first end 47 of the first optical device 45, travels through the first optical device 45 and exits from a second end 48 of the first optical device 45, and at least a second portion of the mixed light enters a first end 49a of the second optical device 46, travels through the second optical device 46 and exits from a second end 49b of the second optical device 46.

Figure 5:
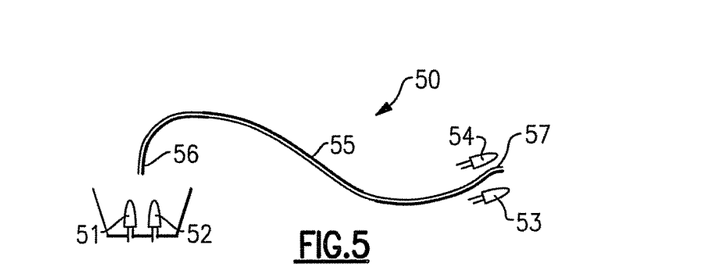
FIG. 5 depicts a second representative embodiment according to the third aspect of the present invention.

FIG. 5 depicts a second representative embodiment according to the third aspect of the present invention. Referring to FIG. 5, there is provided a lighting device 50 including a first solid state light emitter 51, a second solid state light emitter 52, a third solid state light emitter 53, a fourth solid state light emitter 54 and an optical device 55. The first solid state light emitter 51 and the second solid state light emitter 52 each include a light emitting diode which, if illuminated, emits light having a peak wavelength in the range of from 430 nm to 480 nm and a lumiphor which, if excited (which occurs when the light emitting diode is illuminated), emits light having a dominant wavelength in the range of from about 555 nm to about 585 nm. The third solid state light emitter 53 and the fourth solid state light emitter 54 are each light emitting diodes which, if illuminated, emit light having a dominant wavelength in a range of from 600 nm to 630 nm. When the light emitting diodes included in the first solid state light emitter 51 and the second solid state light emitter 52, and the light emitting diodes of the third solid state light emitter 53 and the fourth solid state light emitter 54, are illuminated, the light emitted from the solid state light emitters 51 and 52 is mixed, and at least a first portion of the mixed light enters a first end 56 of the optical device 55, travels through the optical device 55 and exits from a second end 57 of the optical device 55. The light which exits from the second end 57 of the optical device 55 then mixes with light emitted from the third solid state light emitter 53 and the fourth solid state light emitter 54.

Figure 6:
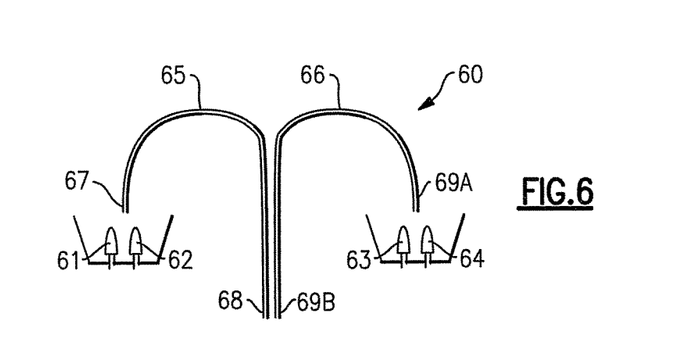
FIG. 6 depicts a third representative embodiment according to the third aspect of the present invention.

FIG. 6 depicts a third representative embodiment according to the third aspect of the present invention. Referring to FIG. 6, there is provided a lighting device 60 including a first solid state light emitter 61, a second solid state light emitter 62, a third solid state light emitter 63, a fourth solid state light emitter 64 a first optical device 65 and a second optical device 66. The first solid state light emitter 61 and the second solid state light emitter 62 each include a light emitting diode which, if illuminated, emits light having a peak wavelength in the range of from 430 nm to 480 nm and a lumiphor which, if excited (which occurs when the light emitting diode is illuminated), emits light having a dominant wavelength in the range of from about 555 nm to about 585 nm. The third solid state light emitter 63 and the fourth solid state light emitter 64 are each light emitting diodes which, if illuminated, emit light having a dominant wavelength in a range of from 600 nm to 630 nm. When the light emitting diodes included in the first solid state light emitter 61 and the second solid state light emitter 62, and the light emitting diodes of the third solid state light emitter 63 and the fourth solid state light emitter 64, are illuminated, the light emitted from the solid state light emitters 61 and 62 is mixed, at least a first portion of the mixed light from the solid state light emitters 61 and 62 enters a first end 67 of the first optical device 65, travels through the first optical device 65 and exits from a second end 68 of the first optical device 65, the light emitted from the solid state light emitters 63 and 64 is mixed, at least a first portion of the mixed light from the solid state light emitters 63 and 64 enters a first end 69a of the second optical device 66, travels through the second optical device 66 and exits from a second end 69b of the second optical device 66. The light which exits from the second end 68 of the first optical device 65 then mixes with light which exits from the second end 69b of the second optical device 66.

As noted above, in accordance with the fourth aspect of the present invention, there is provided a lighting device comprising:

a first group of LEDs, the first group of LEDs comprising at least a first LED;

a first group of lumiphors, the first group of lumiphors comprising at least a first lumiphor;

at least a first optical device, wherein:

each of the first group of light emitting diodes, if illuminated, emits light having a peak wavelength in a range of from 430 nm to 480 nm n;

each of the first group of lumiphors, if excited, emits light having a dominant wavelength in a range of from about 555 nm to about 585 nm; and if each of the first group of LEDs is illuminated and each of the first group of lumiphors is excited, at least some light from among light emitted from the first group of LEDs and the light emitted from the first group of lumiphors travels through at least a first portion of the first optical device.

Figure 7:
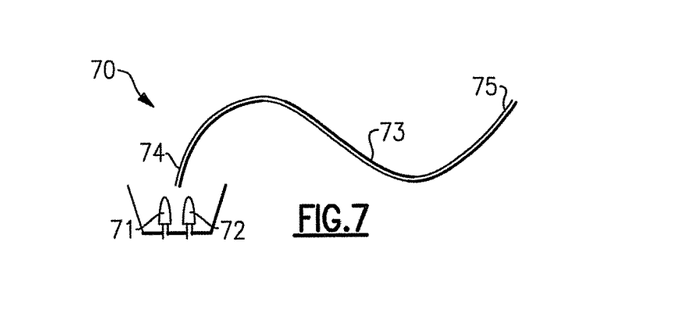
FIG. 7 depicts a first representative embodiment according to the fourth aspect of the present invention.

FIG. 7 depicts a first representative embodiment according to the fourth aspect of the present invention. Referring to FIG. 7, there is provided a lighting device 70 including a first solid state light emitter 71, a second solid state light emitter 72 and an optical device 73. The first solid state light emitter 71 and the second solid state light emitter 72 each include a light emitting diode which, if illuminated, emits light having a peak wavelength in the range of from 430 nm to 480 nm and a lumiphor which, if excited (which occurs when the light emitting diode is illuminated), emits light having a dominant wavelength in the range of from about 555 nm to about 585 nm. When the light emitting diodes included in the first solid state light emitter 71 and the second solid state light emitter 72 are illuminated, the light emitted from the solid state light emitters 71 and 72 is mixed, and at least a first portion of the mixed light enters a first end 74 of the optical device 73, travels through the optical device 73 and exits from a second end 75 of the optical device 73.

In accordance with a fifth aspect of the present invention, there is provided a lighting device comprising:

a first group of LEDs, the first group of LEDs comprising at least a first LED;

a first group of lumiphors, the first group of lumiphors comprising at least a first lumiphor;

at least a first optical device, wherein:

if each of the first group of LEDs is illuminated and each of the first group of lumiphors is excited, a mixture of light emitted from the first group of light emitting diodes and the first group of lumiphors has, in the absence of any additional light, a first group mixed illumination having x, y color coordinates which define a point which is within an area on a 1931 CIE Chromaticity Diagram enclosed by first, second, third, fourth and fifth line segments, the first line segment connecting a first point to a second point, the second line segment connecting the second point to a third point, the third line segment connecting the third point to a fourth point, the fourth line segment connecting the fourth point to a fifth point, and the fifth line segment connecting the fifth point to the first point, the first point having x, y coordinates of 0.32, 0.40, the second point having x, y coordinates of 0.36, 0.48, the third point having x, y coordinates of 0.43, 0.45, the fourth point having x, y coordinates of 0.42, 0.42, and the fifth point having x, y coordinates of 0.36, 0.38, and the mixture of light travels through at least a first portion of the first optical device.

A representative embodiment according to the fifth aspect of the present invention can be constructed in a manner which is similar to the embodiment depicted in FIG. 7

In accordance with a sixth aspect of the present invention, there is provided a lighting device comprising:

a first group of LEDs, the first group of LEDs comprising at least a first LED;

a first group of lumiphors, the first group of lumiphors comprising at least a first lumiphor; and at least a first optical device, wherein:

if each of the first group of LEDs is illuminated and each of the first group of lumiphors is excited, at least some light from among the light emitted from the first group of LEDs and the light emitted from the first group of lumiphors travels through at least a first portion of the first optical device.

A representative embodiment according to the fifth aspect of the present invention can be constructed in a manner which is similar to the embodiment depicted in FIG. 7.

In the various aspects and embodiments of the present invention as described above, the optical device can be any optical device (i.e., any device which can be used to provide a path through which light travels). Persons of skill in the art are aware of, and have ready access to, a wide variety of such optical devices. A representative example of an optical device is optical fiber.

Any desired solid state light emitter or emitters can be employed in accordance with the present invention. Persons of skill in the art are aware of, and have ready access to, a wide variety of such emitters. Such solid state light emitters include inorganic and organic light emitters. Examples of types of such light emitters include a wide variety of light emitting diodes (inorganic or organic, including polymer light emitting diodes (PLEDs)), laser diodes, thin film electroluminescent devices, light emitting polymers (LEPs), a variety of each of which are well-known in the art (and therefore it is not necessary to describe in detail such devices, and/or the materials out of which such devices are made). The expression "solid state light emitter", as used herein, can refer to a component including one or more solid state light emitter or a component including one or more solid state light emitter as well as one or more lumiphor. In some embodiments according to the present invention, a lighting device includes one or more solid state light emitter which includes at least one solid state light emitter and at least one lumiphor which emits light, at least a portion of such light emitted by the luminescent element being emitted in response to luminescent material in the luminescent element being excited by light emitted by the at least one solid state light emitter.

The respective light emitters can be similar to one another, different from one another or any combination (i.e., there can be a plurality of solid state light emitters of one type, or one or more solid state light emitters of each of two or more types)

As noted above, one type of solid state light emitter which can be employed are LEDs. Such LEDs can be selected from among any light emitting diodes (a wide variety of which are readily obtainable and well known to those skilled in the art, and therefore it is not necessary to describe in detail such devices, and/or the materials out of which such devices are made). For instance, examples of types of light emitting diodes include inorganic and organic light emitting diodes, a variety of each of which are well-known in the art.

Representative examples of such LEDs, many of which are known in the art, can include lead frames, lumiphors, encapsulant regions, etc.

Representative examples of suitable LEDs are described in:

(1) U.S. Patent Application No. 60/753,138, filed on Dec. 22, 2005, entitled "Lighting Device" (inventor: Gerald H. Negley), the entirety of which is hereby incorporated by reference, and U.S. patent application Ser. No. 11/614,180, filed Dec. 21, 2006;

(2) U.S. Patent Application No. 60/794,379, filed on Apr. 24, 2006, entitled "Shifting Spectral Content in LEDs by Spatially Separating Lumiphor Films" (inventors: Gerald H. Negley and Antony Paul van de Ven), the entirety of which is hereby incorporated by reference, and U.S. patent application Ser. No. 11/624,811, filed Jan. 19, 2007;

(3) U.S. Patent Application No. 60/808,702, filed on May 26, 2006, entitled "Lighting Device" (inventors: Gerald H. Negley and Antony Paul van de Ven), the entirety of which is hereby incorporated by reference, and U.S. patent application Ser. No. 11/751,982, filed May 22, 2007;

(4) U.S. Patent Application No. 60/808,925, filed on May 26, 2006, entitled "Solid State Light Emitting Device and Method of Making Same" (inventors: Gerald H. Negley and Neal Hunter), the entirety of which is hereby incorporated by reference, and U.S. patent application Ser. No. 11/753,103, filed May 24, 2007;

(5) U.S. Patent Application No. 60/802,697, filed on May 23, 2006, entitled "Lighting Device and Method of Making" (inventor: Gerald H. Negley), the entirety of which is hereby incorporated by reference, and U.S. patent application Ser. No. 11/751,990, filed May 22, 2007;

(6) U.S. Patent Application No. 60/839,453, filed on Aug. 23, 2006, entitled "LIGHTING DEVICE AND LIGHTING METHOD" (inventors: Antony Paul van de Ven and Gerald H. Negley), the entirety of which is hereby incorporated by reference;

(7) U.S. Patent Application No. 60/857,305, filed on Nov. 7, 2006, entitled "LIGHTING DEVICE AND LIGHTING METHOD" (inventors: Antony Paul van de Ven and Gerald H. Negley, the entirety of which is hereby incorporated by reference;

(8) U.S. Patent Application No. 60/851,230, filed on Oct. 12, 2006, entitled "LIGHTING DEVICE AND METHOD OF MAKING SAME" (inventor: Gerald H. Negley, the entirety of which is hereby incorporated by reference.

The lighting devices according to the present invention can comprise any desired number of solid state emitters.

As indicated above, in some embodiments according to the present invention, there are provided lighting devices which include at least a first LED and at least a first lumiphor. In some such embodiments, the light emitted from the first LED has a peak wavelength in a range of from 430 nm to 480 nm, and the light emitted from the first lumiphor has a dominant wavelength in a range of from about 555 nm to about 585 nm.

As indicated above, in some embodiments according to the present invention, there are provided lighting devices which include at least a first LED, at least a first lumiphor and at least a second LED. In some such embodiments, the light emitted from the first LED has a peak wavelength in a range of from 430 nm to 480 nm, and the light emitted from the first lumiphor has a dominant wavelength in a range of from about 555 nm to about 585 nm, and the light emitted from the second LED has a dominant wavelength in a range of from 600 nm to 630 nm As indicated above, in some embodiments according to the present invention, there are provided lighting devices which include at least a first solid state light emitter (which, in some such embodiments includes at least a first LED and at least a first lumiphor) which, if illuminated, emits light which has x, y color coordinates which define a point which is within an area on a 1931 CIE Chromaticity Diagram enclosed by first, second, third, fourth and fifth line segments, the first line segment connecting a first point to a second point, the second line segment connecting the second point to a third point, the third line segment connecting the third point to a fourth point, the fourth line segment connecting the fourth point to a fifth point, and the fifth line segment connecting the fifth point to the first point, the first point having x, y coordinates of 0.32, 0.40, the second point having x, y coordinates of 0.36, 0.48, the third point having x, y coordinates of 0.43, 0.45, the fourth point having x, y coordinates of 0.42, 0.42, and the fifth point having x, y coordinates of 0.36, 0.38.

In general, light of any number of colors can be mixed by the lighting devices according to the present invention. Representative examples of blends of light colors are described in:

(1) U.S. Patent Application No. 60/752,555, filed Dec. 21, 2005, entitled "Lighting Device and Lighting Method" (inventors: Antony Paul Van de Ven and Gerald H. Negley), the entirety of which is hereby incorporated by reference, and U.S. patent application Ser. No. 11/613,714, filed Dec. 20, 2006;

(2) U.S. Patent Application No. 60/752,556, filed on Dec. 21, 2005, entitled "SIGN AND METHOD FOR LIGHTING" (inventors: Gerald H. Negley and Antony Paul van de Ven), the entirety of which is hereby incorporated by reference, and U.S. patent application Ser. No. 11/613,733, filed Dec. 20, 2006;

(3) U.S. Patent Application No. 60/793,524, filed on Apr. 20, 2006, entitled "LIGHTING DEVICE AND LIGHTING METHOD" (inventors: Gerald H. Negley and Antony Paul van de Ven), the entirety of which is hereby incorporated by reference, and U.S. patent application Ser. No. 11/736,761, filed Apr. 18, 2007;

(4) U.S. Patent Application No. 60/793,518, filed on Apr. 20, 2006, entitled "LIGHTING DEVICE AND LIGHTING METHOD" (inventors: Gerald H. Negley and Antony Paul van de Ven), the entirety of which is hereby incorporated by reference, and U.S. patent application Ser. No. 11/736,799, filed Apr. 18, 2007;

(5) U.S. Patent Application No. 60/793,530, filed on Apr. 20, 2006, entitled "LIGHTING DEVICE AND LIGHTING METHOD" (inventors: Gerald H. Negley and Antony Paul van de Ven), the entirety of which is hereby incorporated by reference, and U.S. patent application Ser. No. 11/737,321, filed Apr. 19, 2007; and (6) U.S. Pat. No. 7,213,940, issued on May 8, 2007, entitled "LIGHTING DEVICE AND LIGHTING METHOD" (inventors: Antony Paul van de Ven and Gerald H. Negley), the entirety of which is hereby incorporated by reference.

As indicated above, some embodiments of the lighting devices according to the present invention can include lumiphors (i.e., luminescence region or luminescent element which comprises at least one luminescent material). The expression "lumiphor", as used herein, refers to any luminescent element, i.e., any element which includes a luminescent material.

A wide variety of luminescent materials (also known as lumiphors or luminophoric media, e.g., as disclosed in U.S. Pat. No. 6,600,175, the entirety of which is hereby incorporated by reference) are well-known and available to persons of skill in the art. For example, a phosphor is a luminescent material that emits a responsive radiation (e.g., visible light) when excited by a source of exciting radiation. In many instances, the responsive radiation has a wavelength which is different from the wavelength of the exciting radiation. Other examples of luminescent materials include scintillators, day glow tapes and inks which glow in the visible spectrum upon illumination with ultraviolet light.

Luminescent materials can be categorized as being down-converting, i.e., a material which converts photons to a lower energy level (longer wavelength) or up-converting, i.e., a material which converts photons to a higher energy level (shorter wavelength).

Inclusion of luminescent materials in LED devices has been accomplished by adding the luminescent materials to a clear or transparent encapsulant material (e.g., epoxy-based, silicone-based, glass-based or metal oxide-based material) as discussed above, for example by a blending or coating process.

For example, U.S. Pat. No. 6,963,166 (Yano '166) discloses that a conventional light emitting diode lamp includes a light emitting diode chip, a bullet-shaped transparent housing to cover the light emitting diode chip, leads to supply current to the light emitting diode chip, and a cup reflector for reflecting the emission of the light emitting diode chip in a uniform direction, in which the light emitting diode chip is encapsulated with a first resin portion, which is further encapsulated with a second resin portion. According to Yano '166, the first resin portion is obtained by filling the cup reflector with a resin material and curing it after the light emitting diode chip has been mounted onto the bottom of the cup reflector and then has had its cathode and anode electrodes electrically connected to the leads by way of wires. According to Yano '166, a phosphor is dispersed in the first resin portion so as to be excited with the light A that has been emitted from the light emitting diode chip, the excited phosphor produces fluorescence ("light B") that has a longer wavelength than the light A, a portion of the light A is transmitted through the first resin portion including the phosphor, and as a result, light C, as a mixture of the light A and light B, is used as illumination.

One or more brightness enhancement films can optionally further be included in the lighting devices according to this aspect of the present invention. Such films are well-known in the art and are readily available. Brightness enhancement films (e.g., BEF films commercially available from 3M) are optional—when employed, they provide a more directional light source by limiting the acceptance angle. Light not "accepted" is recycled by the highly reflective light source enclosure. Preferably, the brightness enhancement films (which can optionally be replaced by one or more extraction films, such as by WFT), if employed, are optimized to limit the viewing angle of the emitted source and to increase the probability of extracting light on the first (or earliest possible) pass.

In addition, one or more scattering elements (e.g., layers) can optionally be included in the lighting devices according to this aspect of the present invention. The scattering element can be included in a lumiphor, and/or a separate scattering element can be provided. A wide variety of separate scattering elements and combined luminescent and scattering elements are well known to those of skill in the art, and any such elements can be employed in the lighting devices of the present invention.

The lighting devices of the present invention can be arranged, mounted and supplied with electricity in any desired manner, and can be mounted on any desired housing or fixture. Skilled artisans are familiar with a wide variety of arrangements, mounting schemes, power supplying apparatuses, housings and fixtures, and any such arrangements, schemes, apparatuses, housings and fixtures can be employed in connection with the present invention. The lighting devices of the present invention can be electrically connected (or selectively connected) to any desired power source, persons of skill in the art being familiar with a variety of such power sources.

The devices according to the present invention can further comprise secondary optics to further change the projected nature of the emitted light. Such secondary optics are well-known to those skilled in the art, and so they do not need to be described in detail herein—any such secondary optics can, if desired, be employed.

The devices according to the present invention can further comprise sensors or charging devices or cameras, etc. For example, persons of skill in the art are familiar with, and have ready access to, devices which detect one or more occurrence (e.g., motion detectors, which detect motion of an object or person), and which, in response to such detection, trigger illumination of a light, activation of a security camera, etc. As a representative example, a device according to the present invention can include a lighting device according to the present invention and a motion sensor, and can be constructed such that (1) while the light is illuminated, if the motion sensor detects movement, a security camera is activated to record visual data at or around the location of the detected motion, or (2) if the motion sensor detects movement, the light is illuminated to light the region near the location of the detected motion and the security camera is activated to record visual data at or around the location of the detected motion, etc.

The expression "lighting device", as used herein, is not limited, except that it is capable of emitting light. That is, a lighting device can be a device which illuminates an area or volume, e.g., a structure, a swimming pool or spa, a room, a warehouse, an indicator, a road, a parking lot, a vehicle, signage, e.g., road signs, a billboard, a ship, a toy, a mirror, a vessel, an electronic device, a boat, an aircraft, a stadium, a computer, a remote audio device, a remote video device, a cell phone, a tree, a window, an LCD display, a cave, a tunnel, a yard, a lamppost, or a device or array of devices that illuminate an enclosure, or a device that is used for edge or back-lighting (e.g., back light poster, signage, LCD displays), bulb replacements (e.g., for replacing AC incandescent lights, low voltage lights, fluorescent lights, etc.), lights used for outdoor lighting, lights used for security lighting, lights used for exterior residential lighting (wall mounts, post/column mounts), ceiling fixtures/wall sconces, under cabinet lighting, lamps (floor and/or table and/or desk), landscape lighting, track lighting, task lighting, specialty lighting, ceiling fan lighting, archival/art display lighting, high vibration/impact lighting—work lights, etc., mirrors/vanity lighting, or any other light emitting device.

The present invention further relates to an illuminated enclosure (the volume of which can be illuminated uniformly or non-uniformly), comprising an enclosed space and at least one lighting device according to the present invention, wherein the lighting device illuminates at least a portion of the enclosure (uniformly or non-uniformly).

The present invention is further directed to an illuminated area, comprising at least one item, e.g., selected from among the group consisting of a structure, a swimming pool or spa, a room, a warehouse, an indicator, a road, a parking lot, a vehicle, signage, e.g., road signs, a billboard, a ship, a toy, a mirror, a vessel, an electronic device, a boat, an aircraft, a stadium, a computer, a remote audio device, a remote video device, a cell phone, a tree, a window, an LCD display, a cave, a tunnel, a yard, a lamppost, etc., having mounted therein or thereon at least one lighting device as described herein.

Any two or more structural parts of the lighting devices described herein can be integrated. Any structural part of the lighting devices described herein can be provided in two or more parts (which are held together, if necessary). Similarly, any two or more functions can be conducted simultaneously, and/or any function can be conducted in a series of steps.

Furthermore, while certain embodiments of the present invention have been illustrated with reference to specific combinations of elements, various other combinations may also be provided without departing from the teachings of the present invention. Thus, the present invention should not be construed as being limited to the particular exemplary embodiments described herein and illustrated in the Figures, but may also encompass combinations of elements of the various illustrated embodiments.

Many alterations and modifications may be made by those having ordinary skill in the art, given the benefit of the present disclosure, without departing from the spirit and scope of the invention. Therefore, it must be understood that the illustrated embodiments have been set forth only for the purposes of example, and that it should not be taken as limiting the invention as defined by the following claims. The following claims are, therefore, to be read to include not only the combination of elements which are literally set forth but all equivalent elements for performing substantially the same function in substantially the same way to obtain substantially the same result. The claims are thus to be understood to include what is specifically illustrated and described above, what is conceptually equivalent, and also what incorporates the essential idea of the invention.

The invention claimed is:

1. A lighting device, comprising:
at least first and second solid state light emitters; and at least first and second optical fibers, wherein: when electricity is supplied to each of said first and second solid state light emitters: at least one of the first and second solid state light emitters emits non-white light, at least a portion of light emitted from said first solid state light emitter enters said first optical fiber in a first direction and at least a portion of light emitted from said second solid state light emitter enters said second optical fiber in a second direction, said first direction and said second direction not parallel, light exiting the first optical fiber that was emitted from said first solid state light emitter exits said first optical fiber (1) in a direction parallel to a direction that light exiting the second optical fiber that was emitted from said second solid state light emitter exits said second optical fiber, and (2) at a location adjacent to where light exiting the second optical fiber that was emitted from said second solid state light emitter exits said second optical fiber, and light exiting the first optical fiber that was emitted from said first solid state light emitter and light exiting the second optical fiber that was emitted from said second solid state light emitter mix to make white light.

2. A lighting device as recited in claim 1, wherein if said first optical fiber were not included, at least a portion of light emitted from said first solid state light emitter would not mix with said light emitted from said second solid state light emitter.

3. A lighting device as recited in claim 1, wherein if said first optical fiber were not included, none of said light emitted from said first solid state light emitter would mix with said light emitted from said second solid state light emitter.

4. A lighting device as recited in claim 1, wherein the first solid state light emitter comprises a light emitting diode.

5. A lighting device as recited in claim 1, wherein the first solid state light emitter comprises a light emitting diode and a lumiphor.

6. A lighting device as recited in claim 1, wherein (1) a distance between a location where light exits the first optical fiber and a location where light exits the second optical fiber is smaller than (2) a distance between the first solid state light emitter and the second solid state light emitter.

7. A lighting device as recited in claim 1, wherein when electricity is supplied to each of said first and second solid state light emitters, each of the first and second solid state light emitters emits non-white light.

8. A lighting device as recited in claim 1, wherein when electricity is supplied to each of said first and second solid state light emitters:
light emitted from the first solid state light emitter has x, y color coordinates which define a point which is within an area on a 1931 CIE Chromaticity Diagram enclosed by first, second, third, fourth and fifth line segments, the first line segment connecting a first point to a second point, the second line segment connecting the second point to a third point, the third line segment connecting the third point to a fourth point, the fourth line segment connecting the fourth point to a fifth point, and the fifth line segment connecting the fifth point to the first point, the first point having x, y coordinates of 0.32, 0.40, the second point having x, y coordinates of 0.36, 0.48, the third point having x, y coordinates of 0.43, 0.45, the fourth point having x, y coordinates of 0.42, 0.42, and the fifth point having x, y coordinates of 0.36, 0.38, and
light emitted from the second solid state light emitter has a dominant wavelength in a range of from 600 nm to 630 nm.

9. A lighting device, comprising:
at least first and second solid state light emitters; and
at least first and second optical fibers,
wherein:
when electricity is supplied simultaneously to each of said first and second solid state light emitters:
said first solid state light emitter emits non-white light,
said second solid state light emitter emits non-white light,
at least a first portion of said non-white light emitted from said first solid state light emitter enters said first optical fiber at the same time that at least a first portion of said non-white light emitted from said second solid state light emitter enters said second optical fiber,
said first portion of said non-white light emitted from said first solid state light emitter exits said first optical fiber at the same time that said first portion of said non-white light emitted from said second solid state light emitter exits said second optical fiber, and said first portion of said non-white light emitted from said first solid state light emitter exits said first optical fiber at a location adjacent to where said first portion of said non-white light emitted from said second solid state light emitter exits said second optical fiber; and
after said first portion of said non-white light emitted from said first solid state light emitter exits said first optical fiber and said first portion of said non-white light emitted from said second solid state light emitter exits said second optical fiber, said first portion of said non-white light emitted from said first solid state light emitter and said first portion of said non-white light emitted from said second solid state light emitter mix to make white light.

10. A lighting device as recited in claim 9, wherein light emitted by said first solid state light emitter enters said first optical fiber in a first direction and light emitted by said second solid state light emitter enters said second optical fiber in a second direction, said first direction and said second direction not parallel.

11. A lighting device as recited in claim 9, wherein if said first optical fiber were not included, at least a portion of light emitted from said first solid state light emitter would not mix with said light emitted from said second solid state light emitter.

12. A lighting device as recited in claim 9, wherein if said first optical fiber were not included, none of said light emitted from said first solid state light emitter would mix with said light emitted from said second solid state light emitter.

13. A lighting device as recited in claim 10, wherein if said first optical fiber were not included, none of said light emitted from said first solid state light emitter would mix with said light emitted from said second solid state light emitter.

14. A lighting device as recited in claim 9, wherein (1) a distance between a location where light exits the first optical fiber and a location where light exits the second optical fiber is smaller than (2) a distance between the first solid state light emitter and the second solid state light emitter.

15. A lighting device as recited in claim 9, wherein:
said non-white light emitted from the first solid state light emitter has x, y color coordinates which define a point which is within an area on a 1931 CIE Chromaticity Diagram enclosed by first, second, third, fourth and fifth line segments, the first line segment connecting a first point to a second point, the second line segment connecting the second point to a third point, the third line segment connecting the third point to a fourth point, the fourth line segment connecting the fourth point to a fifth point, and the fifth line segment connecting the fifth point to the first point, the first point having x, y coordinates of 0.32, 0.40, the second point having x, y coordinates of 0.36, 0.48, the third point having x, y coordinates of 0.43, 0.45, the fourth point having x, y coordinates of 0.42, 0.42, and the fifth point having x, y coordinates of 0.36, 0.38, and said non-white light emitted from the second solid state light emitter has a dominant wavelength in a range of from 600 nm to 630 nm.

* * * * *